Feb. 20, 1968         W. K. HALNAN         3,369,288
METHOD OF DIFFUSION BONDING A HONEYCOMB STRUCTURE
Filed June 24, 1963                3 Sheets-Sheet 1
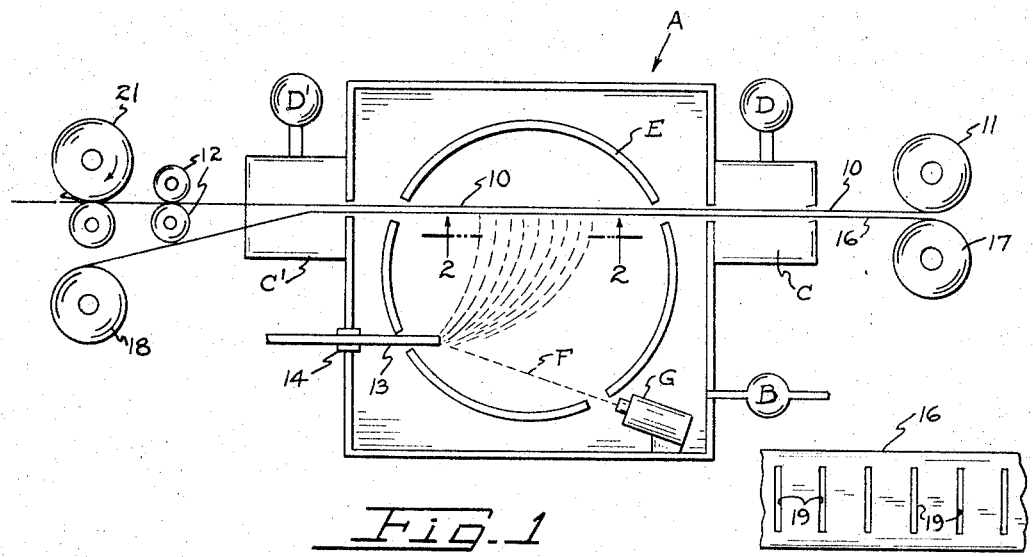
Fig. 1
Fig. 2
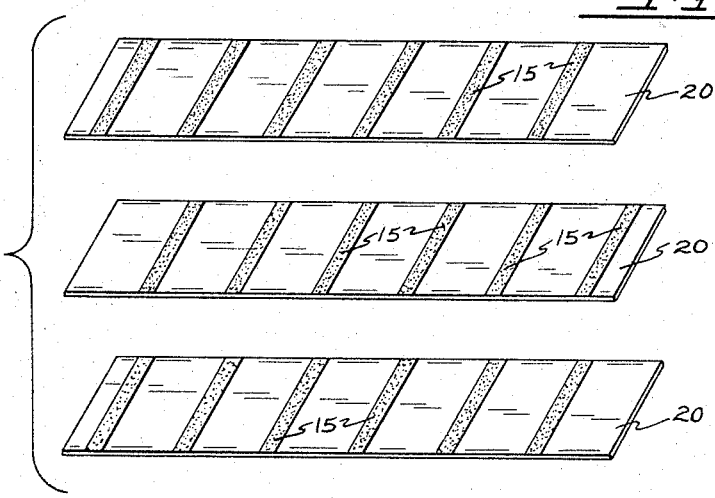
Fig. 3
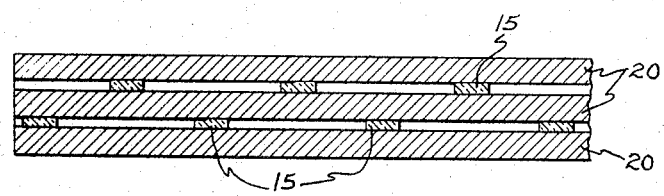
Fig. 4
INVENTOR.
WILLIAM K. HALNAN
BY
Townsend and Townsend
ATTORNEYS INVENTOR.
WILLIAM K. HALNAN
BY
Townsend and Townsend
ATTORNEYS INVENTOR.
WILLIAM K. HALNAN
BY
Townsend & Townsend
ATTORNEYS

United States Patent Office 3,369,288
Patented Feb. 20, 1968

3,369,288
METHOD OF DIFFUSION BONDING A
HONEYCOMB STRUCTURE
William K. Halnan, Oakland, Calif., assignor to Hexcel
Corporation, a corporation of California
Filed June 24, 1963, Ser. No. 289,928
2 Claims. (Cl. 29—471.1)

This invention relates to the art of diffusion bonding two or more metal sheets or foils together at preselected points. More specifically, the invention relates to the concept of depositing by condensation thin layers (the thickness being in the order of micro-inches or even angstroms) or an intermediate metal or metal alloy at spaced apart areas at the interfaces between two metallic foils or ribbons to be joined. Hereafter throughout the specification and claims, and unless otherwise specifically limited, the term "metal" or "metallic" is intended to embrace both pure metals and metal alloys.

Heretofore, it has been proposed to diffusion weld two or more sheets of similar or dissimilar metals to one another at preselected localized areas by applying a stop-off or masking material between the sheets at the regions where welding is not to occur. Thereafter, the sheets have been subjected to diffusion bonding pressures and temperature usually under protective atmosphere to cause the sheets to weld to one another at the areas where no stop-off material has been applied. Examples of this prior art practice are set forth in U.S. Patents Nos. 2,766,514 (Adams) and 2,759,246 (Campbell).

The use of a weld preventive or stop-off material may produce satisfactory results in certain applications. However, the use of such stop-off materials can create many manufacturing problems including, for example, the difficulty of applying the stop-off in uniform amounts and over precisely defined areas, the difficulty of selecting a stop-off material that will deleteriously react with or affect the metals, and/or the difficulty of selecting and applying a stop-off material that can be readily and economically removed or cleaned off the metal surfaces after the welding operation is completed. The present invention can be utilized to eliminate the need for weld-preventive or stop-off materials by virtue of the fact that with a properly chosen intermediate metal applied at spaced apart areas at the interfaces between metal sheets to be joined, a diffusion bond can be caused to occur at the interfaces at temperatures and pressures below those which will diffusion bond the metal sheets at the regions in between the preselected interface areas where the intermediate metal has been deposited.

It has also been proposed heretofore to enhance diffusion bonding between similar or dissimilar metals by electroplating selected intermediate metals at the interfaces between the metal sheets to be joined. An example of such prior art practice is disclosed in U.S. Patent No. 2,473,712 (Kinney).

Although this electroplating technique of applying intermediate metals is satisfactory with certain metals, there are a number of drawbacks or limitations attendant with use of electroplating. Firstly, certain metals which are very difficult to diffusion bond to one another without an intermediate metal (such as the refractory metal molybdenum) cannot be satisfactorily electroplated with any known suitable intermediate metal such as titanium. On the other hand, it is entirely feasible with the present invention to evaporate and condense on any metal known to us (and specifically including molybdenum and columbium) uniform layers of an intermediate metal such as titanium above mentioned. Secondly, in electroplating of metals, hydrogen is often absorbed and/or adsorbed by the plating metal and this in turn can lead to problems of diffusion bonding as may be occasioned by the fact that hydrogen is out-gassed under diffusion bonding temperatures leading to unsatisfactory bonds and/or hydrogen may react with certain metals to form metal hydrides which inhibit an optimum bond and may also remain as a permanent contaminant or corrosive agent. Thirdly, it is not generally possible to electroplate other than substantially pure metals as distinguished from alloys of metals. In diffusion bonding of certain metals it is considered desirable to employ a metal alloy at the interface where joinder is to be made.

It is believed to be within the capabilities of the present state of the art to simultaneously evaporate and condense two or more alloying metals. For example, in accordance with one aspect of the present invention, two sources or reservoirs of two different metals are provided in an electron beam furnace and are simultaneously heated (with separate electron beams) to cause the two sources to evaporate and deposit on a given adjacent surface at a predetermined quantity or percentage ratio to each other whereby to form an alloy deposit of the two or more metals in any desired thickness. As above indicated, we are not aware that any such results can be obtained by electroplating metals within the present skill of the art.

Although the invention will be described by way of illustration and example in particular reference to the fabrication of honeycomb core sections, it is understood that in its broader aspects the invention is not limited to the manufacture of honeycomb or any specific type of end product.

Other objects of the present invention will become apparent upon reading the following specification and referring to the accompanying drawings in which similar characters of reference represent corresponding parts in each of the several views.

In the drawings:

FIG. 1 is a side sectional view in diagrammatic form of means by which a bonding material is deposited by vacuum evaporation on a refractory metal;

FIG. 2 is a view of a portion of the structure shown in FIG. 1 taken along line 2—2;

FIG. 3 is an exploded perspective view showing several sheets of refractory metal to which bonding material has been applied for producing a honeycomb structure;

FIG. 4 shows a side sectional view of a stack of refractory metal sheets to which a bonding material has been applied;

Figure 5:
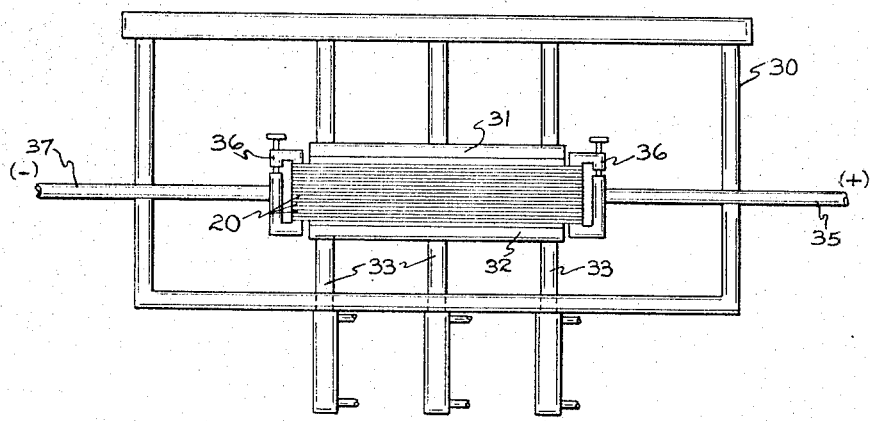
FIG. 5 is an elevational sectional view of the means by which the sandwich structure is bonded.

To illustrate the invention in more detail, the drawing sets forth a somewhat schematic arrangement of the apparatus and physical nature of the metal sheets as they are prepared for welding, during the welding process, and after being welded.

FIG. 1 of the drawings illustrates schematically an electron beam furnace chamber A through which is passed a continuous metal sheet, foil or web 10 (which terms are used synonymously herein) for coating thereon lines of intermediate bonding metal. The web 10 is pulled from a storage reel 11 through the chamber A by means of a pair of pulling rollers 12. The chamber A is evacuated of air by means of a pump B and the web 10 passes through entrance and exit chambers C and C', respectively, partially evacuated by means of pumps D and D' before entering and leaving the chamber A. By this arrangement a reasonably good vacuum may be maintained within the chamber A during continuous operation of the electron beam furnace as described below.

Within the chamber A, in close proximity to the web 10 passing therethrough is positioned a piece of metal stock 13 of the intermediate metal dissimilar to the metal of the web 10. This stock is fed into the chamber A through a vacuum seal 14 as the inner end of the stock is consumed. Also, inside the chamber A a shield E surrounds the end of the stock 13 and the portion of the web 10 adjacent thereto. This shield is maintained hot by, for example, resistance heating from electrical current applied thereto. An electron beam F is directed from an electron gun G through an aperture in the shield E and onto the inner end of the stock 13 to heat the stock to evaporation temperature.

A masking material 16 such as, for example, a molybdenum web is also fed through the electron beam furnace chamber A and is positioned between the web 10 and the interface material stock 13. This masking material is pulled from a storage reel 17 onto a take-up reel 18, and is provided with slits 19 (see FIG. 2) therein which permit passage of evaporated stock metal therethrough onto the web 10. This evaporated interface metal condenses on the masking material and in lines 15 on the web 10. The web 10 is maintained cold enough with respect to the shield E so that the intermediate metal condenses on the web but hot enough so that a good bond is achieved between the intermediate metal and the web 10. The thickness of the condensed intermediate metal is easily controlled by regulating the speed of the web material 10 through chamber A. After passing through the chamber A, the web material 10 is cut into foil sheets 20 by, for example, a cutter 21, and the sheets 20 are then stacked in abutting relationship with the lines 15 of condensed intermediate metal alternately staggered between successive sheets. (See FIGS. 3 and 4 wherein the thickness of the lines 15 is greatly exaggerated.) Alternatively, the stack may be one continuous piece of web material folded over at the end of each layer and with the condensed intermediate metal properly staggered. The terms "stack" or "stacking" are used herein to include the latter arrangement.

The layer of intermediate metal that is condensed on the masking material 16 may be reclaimed in any of a number of known ways and then re-used.

Referring now to FIG. 5, this stack of sheets 20 is placed in an enclosure 30 which may be referred to generally as a furnace or oven. This enclosure is evacuated by a pump (not shown) to produce a contaminant-free atmosphere. This stack of sheets 20 is physically compressed between, for example, a stationary press bed 31 and a movable press platen 32. The platen 32 is forced toward the bed 31 by means of hydraulic rams 33. There is no illustration of the source of hydraulic pressure and controls for the rams 33, there being known and understood apparatus for such purposes.

The method of heating the stack within the press to diffusion welding temperature at the layered regions is largely a matter of choice or design and will depend to some extent upon the type and the physical characteristics of the metal foils to be welded. Thus, for example, as shown in FIG. 5, the stack is electrically and thermally insulated from the bed 31 and platen 32 by a thin sheet 34 of insulating material such as aluminum oxide or the like. Then, with the stack serving as its own resistance heating element, the sheets 20 are heated electrically by passing a current from a source 35 through clamps 36 attached adjacent each end the stack to ground 37.

Upon application of the necessary amount of pressure and temperature for a predetermined length of time, the intermediate metal migrates into the adjacent metal sheets 20, and a diffusion weld is created between adjacent metal members only at the nodal regions of the deposited intermediate metal. The pressure and temperaturese are then reduced and the stack removed from the furnace.

By depositing the intermediate metal on the metal sheets 20 in a sufficiently thin layer (one measured in microinches or even angstroms) it has been discovered possible to obtain a strong solid solution bond at the regions of deposited intermediate metal with no remaining discrete layer of substantially pure intermediate metal but rather with a continuous region between the metal sheets, this region being rich with the interface material. The metal sheets are not bonded together in the anti-nodal regions between the regions of deposited intermediate metal. In certain instances, in order to obtain the continuous solution at the bonded regions, it may be necessary to maintain the heat on the structure after the pressure has been reduced or to post heat treat the structure in a separate operation.

Figure 6:
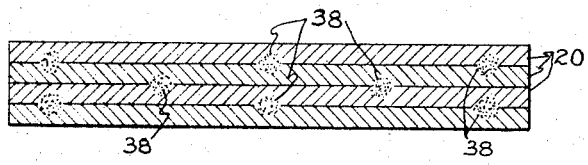
FIG. 6 is a side sectional view of a plurality of sheet members bonded together in desired nodal regions.

FIG. 6 is an illustration of the diffusion welded stack of metal sheets.

Figure 7:
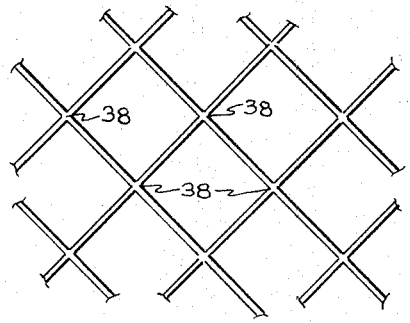
FIG. 7 is a plan view of the structure shown in FIG. 6 after expansion into a honeycomb structure.

The stack of ribbon material bonded in regions 38 is expanded by applying tension at opposite sides thereof to produce the honeycomb structure shown in FIG. 7. The bonded areas 38 are the areas in FIG. 7 which unite the metal sheets 20 as a unitary structure, and when these bonded areas are continuous solid solutions of sheet metal and intermediate metal the strength-temperature characteristics of the bond are often better than the strength-temperature characteristics of the pure intermediate metal. The thickness of deposited intermediate metal that produces the most desirable continuous solid solution diffusion bond naturally depends upon the particular sheet metal, the intermediate metal and the bonding conditions.

A number of different metals can serve as the intermediate metal as long as the intermediate metal is compatible with the metal of the sheet metal members for producing a diffusion bond.

Obviously, instead of having every sheet 20 in the stack coated on one side, every other sheet in the stack may be coated on both sides. This latter structure may be conveniently accomplished by placing pieces of intermediate metal stock on opposite sides of the sheet metal ribbon and simultaneously coating both sides of the metal ribbon with intermediate metal.

Figure 8:
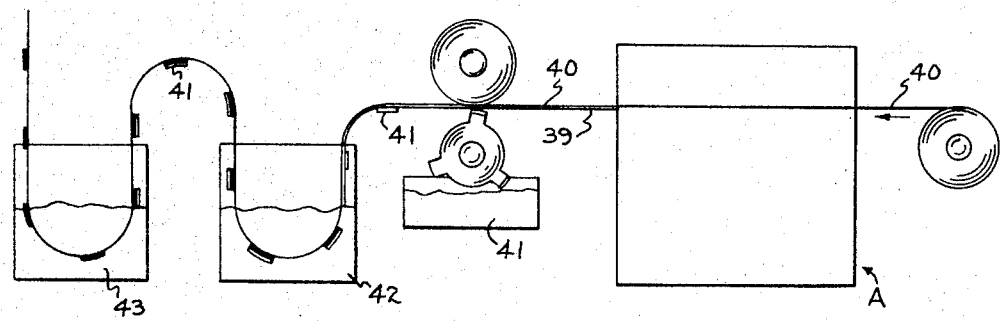
FIG. 8 is a view in diagrammatic form illustrating an alternative method of applying the bonding material to sheet material.

The intermediate metal may be deposited onto the nodal regions of the metal foil in a number of ways somewhat different than that set forth above. For example, as illustrated schematically in FIG. 8, an intermediate metal 39 condensed onto one entire surface of the web 40 in the electron beam furnace A may be removed in the anti-nodal regions after the web 40 has passed through the electron beam furnace. This may be achieved by coating the nodal regions of the intermediate metal layered, metal web 40 with a covering 41 such as, for example, paraffin and passing the web 40 through an acid solution 42 such as, for example, hydrochloric acid to remove the intermediate metal 39 between the nodal regions without affecting the covering 41 or the intermediate metal thereunder. The paraffin covering 41 is then easily removed by a mineral spirits solution 43. As illustrated, the coating material 41 is applied to the metal web 40 by a pair of rollers 44 and 45, one of which is partially submerged in the material 41 and contacts the web 40 only at the nodal regions to apply the coating material thereto.

Another way of applying the intermediate metal only to the nodal regions of the web is to apply a coating to the web in the anti-nodal regions before the web is passed through the electron beam furnace. The coating is selected so that it can be removed along with any intermediate metal condensed thereon after the web has passed through the electron beam furnace and without removing the strips of intermediate metal condensed on the web material between the regions of coating material.

Figure 9:
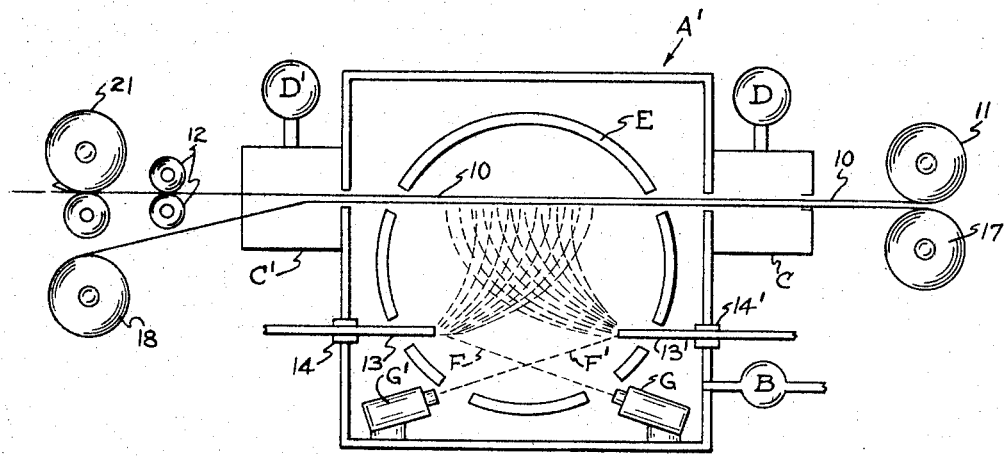
FIG. 9 is a side sectional view in diagrammatic form of a modified apparatus useful in the present invention.

Referring now to FIG. 9, there is shown a schematic arrangement of an electron beam furnace A' of the type that may be used to evaporation deposit a metal alloy intermediate metal onto the web 10'. In this furnace A' are provided two pieces, 13 and 13', of dissimilar metal stock. These metal stocks are simultaneously heated to their respective evaporation temperatures to condense a metal alloy of predetermined quantity or percentage ratio and desired thickness onto the web 10'. The ratio may be controlled by the beam currents of the respective electron beams F and F' and/or by the positions of the stocks 13 and 13' with respect to the web 10' or by other suitable means.

As thus far described, a fully useful disclosure has been set forth which may be practiced by anybody skilled in this art and having a knowledge of metallurgical phenomena. However, in order to illustrate the invention more fully and give further guidance for the complete utilization of the invention, the following example of material and procedures is given.

*Example*

Sheet material .................. Columbium (D-36).
   Cut size:
      Length .............. 2".
      Width ............... .5".
      Gauge ............... .002".
Intermediate metal ............. Titanium (pure).
   Layered size:
      Length .............. .5".
      Width ............... .10".
      Thickness ........... 240µ".

A 240 micro-inch layer of titanium was vacuum evaporated onto one surface of a columbium sheet which was cut into a number of sheets of the cut size noted above. The coated columbium sheets were masked by applying paraffin at the desired nodal regions, these regions extending across the .5" width of the columbium sheets and having a node width of .10" and a node pitch of .3". An acid etching compound (2% HF, 25% $HNO_3$, 73% $H_2O$ by volume) was applied to these paraffin covered, titanium coated sheets and then after etching of the interface material from between the paraffin covered nodal regions, the paraffin was removed with mineral spirits. These sheets with nodal regions coated with the thin layer of titanium were then stacked with the titanium coatings staggered between adjacent sheets as shown in FIG. 4, and the stack was welded using a weld cycle of 1500° F. and 1200 p.s.i. applied to the stack for ten minutes. A good weld was obtained.

Other diffusion welds were obtained using columbium sheets and titanium layers of 60 and 30 micro-inches while with titanium layers of 10, 5 and 3 micro-inches good bonds were not obtained, presumably because sufficient intermediate metal was not present.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. The method of making a honeycomb structure wherein a plurality of metal sheets are bonded together at desired locations corresponding to the node regions of a honeycomb structure formed by expansion of such metal sheets comprising the steps of: depositing by condensation a layer of intermediate metal at spaced intervals on at least one surface of the faying surfaces of a pair of adjacent metal sheets where bonding of said sheets is to occur a layer of intermediate metal dissimilar to the metal of said metal sheets; stacking said sheets one on top of the other with said layers of intermediate metal staggered through said stack so that said sheets will be bonded at staggered positions through said stacks; applying to said sheets heat and pressure below that which produces a diffusion weld between said metal sheets in said spaced intervals in said layers of intermediate metal sufficient to cause a diffusion of said intermediate metal into said sheets to produce diffusion welds joining the metal sheets only at said spaced apart intervals; and expanding said bonded stack of metal sheets into a honeycomb structure.

2. The method of claim 1 wherein the step of depositing said intermediate metal by condensation includes the steps of creating a contaminant-free atmosphere around said metal sheets and evaporating intermediate metal in said atmosphere in close proximity to said metal sheets to cause said evaporated intermediate metal to condense on said metal sheets at only said spaced intervals where bonding of said sheets is to occur.

References Cited

UNITED STATES PATENTS

| | | | |
|---|---|---|---|
| 2,999,306 | 9/1961 | Baxter | 29—157.3 |
| 3,206,847 | 9/1965 | Keeleric | 29—480 |
| 2,851,133 | 9/1958 | Steele | 189—34 |
| 3,011,602 | 12/1961 | Ensrud et al. | 189—34 |
| 3,001,277 | 9/1961 | Giovannucci | 29—502 X |
| 3,016,450 | 1/1962 | Keeleric. | |
| 3,056,937 | 10/1962 | Pritkin | 29—155.7 X |
| 3,095,636 | 7/1963 | Ruckelshaus | 29—155.7 X |
| 3,170,234 | 2/1965 | Tarr | 29—497.5 X |

FOREIGN PATENTS 868,089    5/1961    Great Britain.

JOHN F. CAMPBELL, *Primary Examiner.*